Sept. 19, 1967   J. KARPOVICH ET AL   3,342,922
METHOD OF PREPARING RE-EXPANDABLE FOAM
Filed Oct. 9, 1963
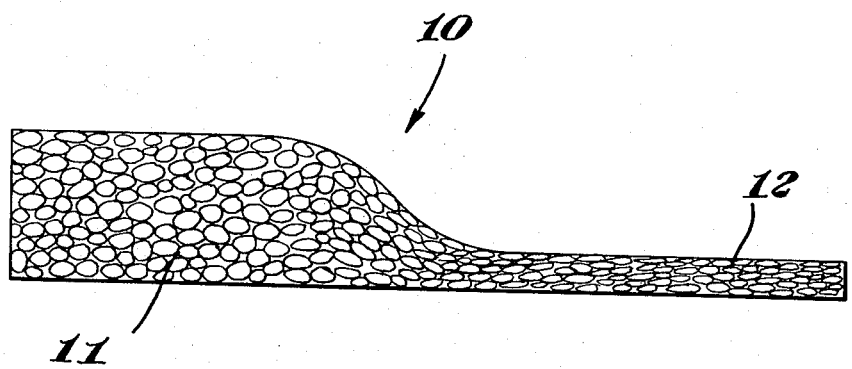
INVENTORS.
John Karpovich
BY Willard F. Clark
AGENT United States Patent Office 3,342,922
Patented Sept. 19, 1967

3,342,922
METHOD OF PREPARING RE-EXPANDABLE FOAM
John Karpovich, Caro, and Willard F. Clark, Midland, Mich., assignors to The Dow Chemical Company, Midland, Mich., a corporation of Delaware
Filed Oct. 9, 1963, Ser. No. 314,881
7 Claims. (Cl. 264—321)

This invention relates to plastic foam. It more particularly relates to the manufacture of a re-expandable plastic foam.

The foam prepared from a wide variety of plastic materials is commonly utilized for many purposes including padding, packing, floral displays and a great multitude of other uses. However, such foams and particularly the polyurethane and epoxy type foams suffer from the economic disadvantage that they have a relatively low bulk density, that is, relatively large volume is required to ship relatively few pounds of such material.

Various attempts have been made to package expanded or foamed plastic materials in relatively small spaces; however, such techniques in general have required the use of packages which in one way or the other would provide a consistent compressional force on the foamed material or attempts to compress the foam would cause it to lose its desired characteristic and permanently deform it.

It is an object of this invention to manufacture an improved re-expandable plastic foam.

A further object of this invention is to manufacture an improved re-expandable polyurethane foam.

Another object of the invention is to provide a method for compacting and re-expanding plastic foam.

A further object of the invention is to manufacture a compressed plastic foam which is readily re-expanded and does not require external force to maintain it in a compressed condition.

These benefits and other advantages in accordance with the present invention are readily achieved by compressing a synthetic resinous foam, selected from the group consisting of polyurethane foams and epoxy resin foams which exhibit in their stress-strain curve a yield point, under a pressure of from about 1 to 50 tons per square inch for a sufficient period of time that the foam does not re-expand. Such foams are readily re-expanded by immersion in a liquid or vapor of a liquid which wets the surface thereof.

The figure depicts an end view of a foam body in accordance with the invention generally designated by the reference numeral 10. The foam body 10 comprises a re-expanded portion 11 and a compressed portion 12.

A wide variety of epoxy and polyurethane foams may be utilized in the practice of the present invention. All those that exhibit a yield point are operable. The particular composition of the foam material does not provide any assurance that a re-expandable material will be obtained. Many foams may be prepared and cured in the conventional manner and found to be inoperable, whereas on standing or subsequent additional curing, they become satisfactory for the preparation of re-expandable foams.

Polyurethane and epoxy foams exhibiting the yield point characteristic may be compressed by a variety of methods into re-expandable foams. By yield point is meant that if a stress strain curve for the foam is plotted to the break point, a point of inflection occurs within this stress strain curve at a point greater than about 10 percent of the maximum indicated strength of the sample, that is, the stress will increase in a generally linear fashion with the strain, the stress will then decrease in a generally linear fashion, however, the curve shows a slight concavity toward the strain axis and if a yield point exists the curvature of at least a portion of the curve will become convex toward the strain axis, or, stated more simply, the stress strain curve exhibits a point of inflection at a strain level greater than about 10 percent of the maximum tensile strength of the foam sample. One particularly convenient method for the preparation of relatively small samples is the use of a press wherein the foam to be compacted is placed between a pair of platens and desired pressure applied. Alternately satisfactory compaction is obtained if pinch rolls are employed. However, in compacting relatively thick samples, relatively large diameter rolls must be utilized in order to provide a relatively smooth transition from a thick sample to the thinner sample. On compaction the cell walls are ruptured and the gas within is expelled, thus utilizing the small rolls and thick sections of foam rupture or splitting of the foam may occur. Such compaction of the foam material may be done at any temperature below the second order transition point and above the brittle temperature. Usually it is desirable for optimum convenience and ease of handling the material to compact it in a temperature range of from about 5–30° centigrade below the second order transition point. The compacted foam may be readily stored for indefinite periods of time under normal storage conditions. It is readily re-expanded by immersion in non-solvent liquids. The optimum temperature and conditions for re-expansion will vary depending on the particular liquid utilized. For example, very rapid expansion often occurs in hot water at temperatures from about 70–100° centigrade. The density of re-expanded foam is generally about the same as the foam prior to compaction. Organic solvents and water with or without wetting agents are readily utilized to re-expand the materials at room temperatures, that is, temperatures in the range above about 10° centigrade.

In re-expanding compacted polyurethane, epoxy and the like foams which have been compressed in accordance with the present invention, water is a material most usually employed. However, if low temperature expansion is desired, various organic materials or aqueous solutions of organic materials may be utilized. For example, the following materials will cause the re-expansion of the compacted foam at 25° centigrade; glacial acetic acid, acetone, methanol, methyl chloride, a 5 percent by weight aqueous solution of phenol, and other materials which provide completed expansion at low temperature are formic acid, dimethyl formamide, and ethanol. At elevated temperatures complete expansion is obtained in chlorobenzene, diethylene glycol, ethylene glycol, and mineral oil. Re-expansion will occur rapidly. For example, complete expansion is obtained in 30 seconds using formic acid, at 22° centigrade whereas in methylene chloride it requires about 150 seconds. Re-expansion readily occurs if the compressed or compacted material is subjected to the vapors of the solvents and as might be expected, the time for re-expansion is considerably longer if the vapors are utilized at a temperature substantially below the boiling point. Although for many purposes it is convenient to re-expand the foam in a liquid bath, this might also be accomplished by treating the compacted or compressed foam by means of hot air. The temperature required for the re-expansion appear to be substantially higher than those required when a wet or vapor phase re-expansion is being carried out. For example, polyurethane samples usually require a temperature of at least 120° centigrade to expand. The rate of expansion in hot air increases rapidly as the temperature is raised above this figure to about 150° centigrade. The rate of expansion at temperatures in excess of about 150° centigrade does not increase rapidly with temperature increases.

By way of further illustration, a number of samples of polyurethane foam were prepared having the compositions set forth in Table I. A one inch cube of foam from each sample was subjected to 10 tons per square inch in press. The one inch samples were compressed ranging from about 1/16 to about 1/4 of an inch depending upon the density of the foam. The time to fully re-expand the foam in heated water at various temperatures is also shown.

(F) Dimethylaminoethanol.
(G) Dibutyl tin dilaurate.
(H) A silicone product of the Dow Corning Corporation utilized as a cell size regulator and sold under the designation of DC–113.
(I) Trichlorofluoromethane.
(J) Trimethyloldiphenoloxide.
(K) A polyisocyanurate prepared by condensing 2 moles of analine with 1 mole of formaldehyde subse-

TABLE I

[These samples all 1″ cubes, were subjected to 10 tons per sq.in. compressive stress]

| Sample Number | Eq. Wt. | | | | | Weight Percent | | Time to Fully Re-expand in Heated Water, sec. (Except where shown otherwise) | | | | | | Percent | | Wt. Eq. | | Wt. Percent | Eq. Wt. |
|---|---|---|---|---|---|---|---|---|---|---|---|---|---|---|---|---|---|---|---|
| | A | B | C | D | E | F | G | 100°C | 90°C | 70°C | 50°C | 40°C | 22°C | H | I | J | K | L | M | N |
| 1[1] | 1.0 | | | | 1.05 | .5 | .5 | No appreciable re-expan. | | | | | | .5 / 1.0 | 20 / 20 | | | | | |
| 2[1] | 1.0 | | | | 1.05 | .5 | .5 | | | | | | | .5 | 20 | | | | | |
| 3 | 1.0 | | | | 1.05 | .5 | .5 | 8 | | | | | | 1.0 | 20 | | | | | |
| 4 | 1.0 | | | | .8 | .5 | .5 | 8 | 11 | [2]15 | | | | .5 | 20 | | | | | |
| 5 | 1.0 | | | | .8 | .5 | .5 | 6 | | | | | | .5 | 20 | | | | | |
| 6 | 1.0 | | | | .8 | .5 | .5 | 7 | 10 | | | | | .5 | 20 | | | | | |
| 7 | 1.0 | | | | .7 | .5 | .5 | 5 | 9 | 10 | 30 | | | .5 | 20 | | | | | |
| 8 | 1.0 | | | | .7 | .5 | .5 | 11 | 15 | 15 | | | | .5 | 20 | | | | | |
| 9 | 1.0 | | | | .7 | .5 | .5 | 7 | | | | | | 1.0 | 20 | | | | | |
| 10 | 1.0 | | | | .6 | .5 | .5 | 7 | | | | | | .5 | 20 | | | | | |
| 11 | 1.0 | | | | .6 | .5 | .5 | 9 | 30 | 60 | 60 | 90 | [2]105 | .5 | 20 | | | | | |
| 12 | 1.0 | | | | .6 | .5 | .5 | 7 | | | | | | .5 | 20 | | | | | |
| 13 | | 1.0 | | | 1.05 | .5 | .5 | 6 | [2]12 | | | | | .5 | 20 | | | | | |
| 14 | | | 1.0 | | 1.05 | .5 | .5 | 9 | 16 | [3]3 | | | | .5 | 20 | | | | | |
| 15 | .9 | | | .1 | 1.05 | .5 | .5 | 6 | 20 | | | | | .5 | 20 | | | | | |
| 16 | .8 | | | .2 | 1.05 | .5 | .5 | 8 | 13 | | | | | .5 | 20 | | | | | |
| 17 | .8 | | | .2 | .8 | .5 | .5 | 9 | 10 | 11 | [2]60 | | | .5 | 20 | | | | | |
| 18 | .6 | | | .4 | 1.05 | .5 | .5 | 10 | 14 | 30 | | | | .5 | 10 | | | | | |
| 19 | .6 | | | | 1.05 | .15 | .15 | 30 | | | | | | .5 | 17 | .4 | | | | |
| 20 | 1.0 | | | | .9 | .5 | .5 | 6 | 13 | | | | | .5 | 20 | | | | | |
| 21 | | | | 1.0 | 1.05 | .5 | .5 | No apprec. re-expan. | | | | | | .5 | 20 | | | | | |
| 22 | .8 | | | .2 | 1.05 | .5 | .5 | 9 | 60 | | | | | .5 | 20 | | | | | |
| 23 | .8 | | | .2 | .8 | .5 | .5 | 8 | 8 | 18 | | | | .5 | 20 | | | | | |
| 24 | .8 | | | .2 | .6 | .5 | .5 | 15 | 15 | 15 | | 90 | | .5 | 20 | | | | | |
| 25[1] | .6 | | | .4 | 1.05 | .5 | .5 | | | | | | | .5 | 20 | | | | | |
| 26[1] | .2 | | | .8 | 1.05 | .5 | .5 | | | | | | | .5 | 20 | | | | | |
| 27[1] | .4 | | | .6 | 1.05 | .5 | .5 | | | | | | | .5 | 20 | | | | | |
| 28[1] | 1.0 | | | | | | | No apprec. re-expan. | | | | | | 1.0 | 20 | | 1.05 | | .4 | |
| 29[1] | 1.0 | | | | | | | | | | | | | 1.0 | 20 | | 1.05 | | .4 | |
| 30[1] | 1.0 | | | | | | | | | | | | | 1.0 | 20 | | 1.05 | | .4 | |
| 31[1] | 1.0 | | | | | | | | | | | | | 1.0 | 20 | | .8 | | .4 | |
| 32[1] | 1.0 | | | | | | | | | | | | | .5 | 20 | | .6 | | .4 | |
| 33[1] | | | | | | | | | | | | | | .5 | 20 | | 1.05 | | .4 | 1.0 |
| 34 | | | | | | .5 | .5 | | 5 | [2]15 | | | | .5 | 20 | | 1.05 | | | 1.0 |
| 35[1] | 1.0 | | | | | | | No apprec. re-expan. | | | | | | 1.0 / 1.0 | 20 / 20 | | | 1.05 | .7 | |
| 36[1] | 1.0 | | | | | | .2 | | | | | | | 1.0 | 20 | | | 1.05 | .7 | |
| 37 | 1.0 | | | | | | | 6 | 6 | [2]7 | | | | 1.0 | 20 | | | .8 | .7 | |
| 38 | 1.0 | | | | | | | 7 | 7 | 30 | | | | 1.0 | 20 | | | .6 | .7 | |
| 39 | | | | | | | | 6 | 6 | [3]4 | | | | .5 | 20 | | | 1.05 | .7 | 1.0 |
| 40 | | | | | | | .4 | | 15 | | | | | 1.0 | 20 | | 1.05 | | .4 | 1.0 |

[1] These samples showed no yield point in a stress strain curve. The remainder of the samples not so marked all exhibited a yield point in the stress strain curve. Generally the greater the evidence of the yield point the more rapid the re-expansion.
[2] Minutes.
[3] Hours.

ADDITIONAL NOTES TO TABLE I (A) Sucrose propoxylated with propylene oxide using an alkali catalyst until a hydroxyl analysis indicates an equivalent weight of 134. The reaction utilized of 36.2 percent by weight sucrose and 63.8 percent propylene oxide.

(B) The reaction product of a 1:1 by weight mixture of sucrose and glycerine butoxylated to a hydroxyl equivalent weight of 121. The weight portion of the reactants was 40.5 percent sucrose, 20.3 percent glycerine and 34.2 percent butylene oxide.

(C) A novolac prepared by condensing phenol and formaldehyde to get a product having from 6 to 8 repeating units each of the units having a hydroxyl group, and subsequently propoxylating this material with 3 moles of propylene oxide per novolac molecule.

(D) A propoxylated propylene glycol which is linearily propoxylated to a molecular weight of 250 and having a hydroxyl equivalent weight of 125.

(E) Crude toluene diisocyanate, the undistilled product of the reaction between phosphene and a mixture of 80 parts of 2,4- and 20 parts of 2,6-toluene diamine having an isocyanate equivalent weight of 105.

quently treating this condensation product with phosgene until a product having an isocyanate equivalent weight of 138 is obtained. The isocyanate product is separated from the remainder of the reaction mixture.

(L) A polyisocyanate as K but prepared from 1.7 moles of analine to 1 mole of formaldehyde and phosgenated to an isocyanate equivalent weight of 135.

(M) Trimethylbutanediamine.

(N) The reaction product of sucrose, and propylene oxide containing reacted in the phenol product 30.7 percent by weight sucrose, 69.3 percent by weight propylene oxide and having a hydroxyl equivalent weight of 159.

A stress strain curve was determined for each of the samples and it was observed that the samples which would not re-expand exhibit no yield point in the stress strain curve, and generally those that re-expanded very slowly exhibited a minimal indication of yield point, while those that expanded rapidly had a relatively large yield point.

Samples of a variety of commercially available foams of various types were treated in a manner similar to the foregoing illustration and the results are set forth in Table II.

TABLE II

| Type of Foam | Formulation | Remarks | Re-expansion |
| --- | --- | --- | --- |
| Epoxy | Proacem No. R06712#4 | Very brittle | Somewhat. |
| Do | Shell epoxy | Rather soft | Yes. |
| Do | (Terace) 5014-18 | Very soft | Somewhat. |
| Do | A | Brittle | Yes. |
| Do | B | do | Yes. |
| Phenolic | Oasis | Soft but brittle | Somewhat. |
| Do | Hydrofoam | do | Do. |
| Polyurethane | 2 lbs./cu. ft. | Rigid | Yes. |
| Do | Prod. FR. 1.7 lbs./cu. ft. | do | Yes. |
| Do | Prod. FR. 2 lbs./cu. ft. | do | Yes. |

As in the first illustration, it was observed that the foams showing a yield point re-expanded. A two inch thick slab of polyurethane foam commercially available under the trade name of "Thurane" was passed between a pair of steel pinch rolls each having a diameter of 8 inches and the foam was compressed by reducing the space between rolls from 1¾ inches to about ⅛ of an inch in steps of about ¼ of an inch. The temperature of the rolls was maintained at about 180° Fahrenheit during this process. The surface speed of the rolls and the feed rate of the foam were about 150 feet per minute. The Thurane foam on testing exhibited a definite yield point in its stress strain curve, was compacted to a thickness of about ⅛ of an inch, and on subsequent heating in water expanded rapidly to its original thickness. The compressed or compacted foam of the present invention is suitable for a wide variety of applications. In the compacting process the foam, if of the close cell variety, is converted to an open cell and is quite absorbent. One particularly useful area for such compacted foam is for use in floral application where the compacted foam may readily be shipped in a relatively low volume container and subsequently the foam may be re-expanded in warm water at the point of use, thus providing a very satisfactory support for cut flowers and the like. For example, flowers with stiffer stems such as roses and the like may be inserted into a re-expanded body of foam without preliminary cutting or preparation of a hole in the foam body. The foam is readily used either as a single block or a number of smaller blocks and particles. By impregnation of the foam with suitable liquid fertilizers, it is readily utilized for rooting cuttings, or growing plants from seed. The porous urethane and epoxy foams of the invention are ideally suited for use as fire starters wherein the re-expanded foam is saturated with a combustible liquid fuel such as alcohol, gasoline, and the like.

Advantageously in certain instances in using explosives, mud capping or tamping is desirable, and when suitable natural materials are not readily available, water filled foam is found to be beneficial.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of preparing a re-expanded synthetic resinous foam comprising compressing a synthetic resinous foam at a temperature below the second order transition point of the synthetic resinous foam, the synthetic resinous foam being selected from the group consisting of polyurethane foams and epoxy resin foams which exhibit in their stress strain curves a yield point, the foams being without adhesion promoting additives, the compression being under a pressure of from about 1 to about 50 tons per square inch for a period of time sufficient that the foam does not re-expand when the pressure is removed, and subsequently re-expanding the foam by treatment with a material selected from the group consisting of water, glacial acetic acid, methanol, methyl chloride, aqueous solutions of phenol, formic acid, dimethyl formamide, ethanol, chlorobenzene, diethylene glycol, ethylene glycol, mineral oil, air having a temperature of at least 120° C. and vapors of the solvents hereinbefore delineated.

2. A method of preparing a re-expanded synthetic resinous foam comprising
    compressing a synthetic resinous foam selected from the group consisting of polyurethane foams and epoxy resin foams which exhibit in their stress strain curve a yield point, the foams being without adhesion promoting additives, under a pressure of from about one to about 50 tons per square inch for a period of time sufficient that the foam does not re-expand when the pressure is removed, subsequently
    immersing the foam in water until the foam has re-expanded.

3. The method of claim 2 wherein the synthetic resinous foam is a polyurethane foam.

4. The method of claim 2 wherein the yield point is discernable in the portion of the stress strain curve lying above a stress level of 10 percent of the maximum tensile strength.

5. The method of claim 2 wherein the foam is compressed by means of pinch rolls.

6. The method of claim 2 wherein the foam is re-expanded by immersion in water at a temperature between 50° and 100° centigrade.

7. The method of claim 2 wherein the synthetic resinous foam is an epoxy resin foam.

References Cited

UNITED STATES PATENTS

| | | | |
| --- | --- | --- | --- |
| 1,045,234 | 11/1912 | Willis et al. | 264—321 XR |
| 2,659,935 | 11/1953 | Hammon | 264—321 |
| 2,681,377 | 6/1954 | Smithers | 264—321 XR |
| 2,867,222 | 1/1959 | Otto et al. | 264—321 XR |
| 2,878,153 | 3/1959 | Hacklander | 264—321 XR |
| 2,933,767 | 4/1960 | Vieli et al. | 264—321 XR |
| 3,101,242 | 8/1963 | Jackson | 264—321 XR |
| 3,103,408 | 9/1963 | Chen et al. | 264—321 |
| 3,125,621 | 3/1964 | Coppick | 264—321 |
| 3,189,669 | 6/1965 | Goldfein | 264—321 XR |
| 3,196,197 | 7/1965 | Goldfein | 264—321 |

FOREIGN PATENTS

| | | |
| --- | --- | --- |
| 781,046 | 8/1957 | Great Britain. |
| 944,285 | 6/1956 | Germany. |

OTHER REFERENCES

Plastics Engineering Handbook, 3rd edition, New York, Reinhold, c. 1960, pp. 140–147.

ALEXANDER H. BRODMERKEL, *Primary Examiner.*

P. E. ANDERSON, *Assistant Examiner.*